United States Patent [19]

Altman et al.

[11] 4,345,618
[45] Aug. 24, 1982

[54] ARRANGEMENT FOR THE REGULATION OF THE HEIGHT OF A LIQUID LEVEL

[75] Inventors: Josef Altman, Domazlice; Zdenek Roth, Pilsen, both of Czechoslovakia

[73] Assignee: Skoda, oborovy podnik, Pilsen, Czechoslovakia

[21] Appl. No.: 223,902

[22] Filed: Jan. 9, 1981

[30] Foreign Application Priority Data

Feb. 2, 1980 [CS] Czechoslovakia ............... 1294-80

[51] Int. Cl.³ .................. F16K 21/16; G05D 9/02
[52] U.S. Cl. .................. 137/393; 73/290 R; 137/396; 137/842; 222/56
[58] Field of Search .......... 137/389, 395, 396, 393, 137/187, 188, 204; 73/290 R; 222/56

[56] References Cited

U.S. PATENT DOCUMENTS

| | | | |
|---|---|---|---|
| 3,174,503 | 3/1965 | Absolon | 137/393 |
| 3,269,404 | 8/1966 | Lebow | 137/393 |
| 3,526,276 | 9/1970 | Bennett et al. | 137/188 |
| 4,024,887 | 5/1977 | McGregor | 137/842 |
| 4,161,188 | 7/1979 | Jorgensen | 137/393 |

FOREIGN PATENT DOCUMENTS

| | | | |
|---|---|---|---|
| 393112 | 6/1933 | United Kingdom | 137/393 |
| 360646 | 2/1973 | U.S.S.R. | 137/395 |

Primary Examiner—George L. Walton

[57] ABSTRACT

Arrangement for the regulation of the height of a liquid level, such arrangement being particularly suitable for the removal of condensate from the regeneration heaters of steam turbines. The arrangement includes a transmitter nozzle for forming a gas-liquid mixture in a first, influx chamber communicating with a tank containing the liquid, a second chamber connected with the influx chamber and containing a two-phase outlet sensor which separates the gas in the gas-liquid mixture, and a system for discharging liquid from the tank including a discharge valve controlled by the pressure of the liquid in the second chamber.

5 Claims, 1 Drawing Figure

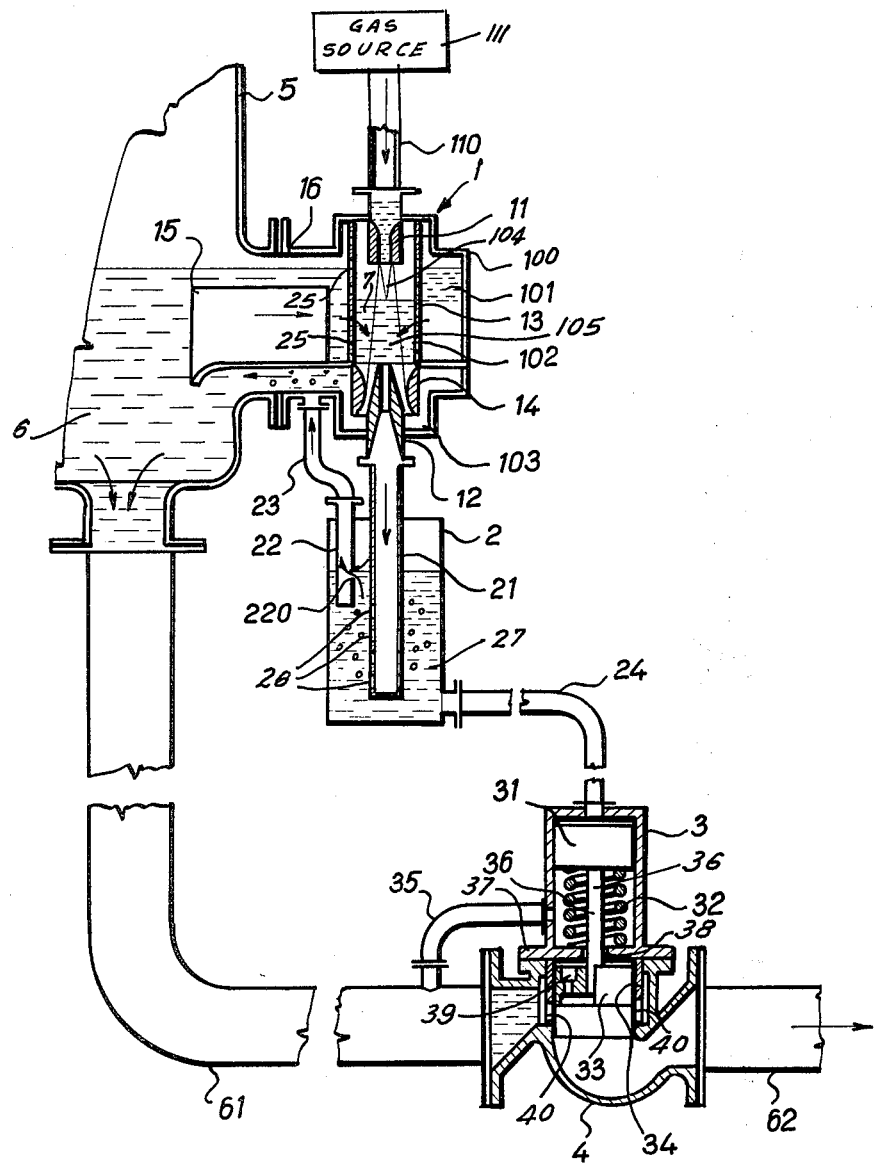

ARRANGEMENT FOR THE REGULATION OF THE HEIGHT OF A LIQUID LEVEL

BACKGROUND OF THE INVENTION

The invention relates to an arrangement for the regulation by fluid means of the height of a liquid level comprising a fluid pick-up device and a two-phase outlet nozzle; such arrangement is particularly suitable for the regulation and removal of condensate from the regeneration heaters of steam turbines.

Arrangements now in use for the removal of condensate and of the regulation of liquid levels are distinguished according to the physical principle employed for obtaining information about the height of the liquid level in the regulated system. The oldest arrangements employ different types of float pick-up devices which transform information as to the height of the liquid level to a mechanical value of the position of the float. In the simplest embodiments of the regulating circuit for small throughflowing amounts of the removed liquid medium, for instance a condensate, it is thus possible directly to control the degree of opening or lift of a regulating valve.

Another simple principle for detecting the height of a liquid level is based on measuring the variations of pressure of a suitable gas passing through a tube submerged in the liquid in a vessel, the gas freely bubbling through the open end of the tube and through the liquid content of the vessel.

In one present practice for detecting the height of the level of a liquid, an electric feeler providing a current or voltage output signal is used. The fluidic principle utilizing changes of dynamic pressure due to the deceleration of a turbulent liquid jet flowing from a transmitting nozzle through a liquid layer above the pick-up nozzle is also used.

All these arrangements have some drawbacks. A common drawback of the three first mentioned arrangements is the low power of the output signal of pick-up devices, such power being insufficient for a direct control of regulating valves for removal of, for instance condensates. A consequence of the necessity of the amplification of the signals provided by these pick-up devices is the increasing complexity of the regulating feedback loop; this results mostly in an insufficiently quick dynamic response of such a circuit to a sudden change of the liquid level. For instance, in the case of a regenerator heater, there results an overstepping of permissible levels of failure, and the removal from operation of the heater from operation due to its breakdown.

A fluidic pick-up device for detecting liquid level provides a hydraulic output of sufficient power for the direct control of hydraulic servo devices for controlling regulating valves; however, the mixture of liquid, vapor and non-condensing gas causes, with a direct interconnection of the fluidic pick-up device and the hydraulic servo device via a longer conduit, oscillations of the control pressure and a discontinuous behavior of the circuit. Another serious drawback for the production of a circuit with quick dynamic response is the generation of a water shock or hammer, which occurs upon a sudden stoppage of a liquid in a long connecting conduit for the removal of the condensate by a quick closing of the regulating valve.

SUMMARY OF THE INVENTION

It is an object of this invention to provide an arrangement for the fluidic regulation of a liquid level, which produces a quick response without causing harmful oscillations of the circuit.

A preferred embodiment of the arrangement of the invention comprises a collecting tank with a connecting conduit, a fluidic pick-up device, and a separator with a two-phase outlet nozzle connected with the drive of a regulating valve. A central channel is coaxially connected to the nozzle of the fluidic pick-up device, said channel being submerged at its lower perforated part in a separator tank. The two-phase nozzle is also submerged in the separator, its return conduit terminating beyond the active space of the separator. The lower part of the separator is connected by a conduit of a hydraulic signal with the drive of the regulating valve situated in the discharge conduit of the tank. A trough is furthermore inserted into the space of the connection of the collecting tank and of the fluidic pick-up device so that between its bottom and the bottom of the connection there is created a channel, which is connected with the internal space of the collecting tank. The bottom of the trough is extended beyond the space of the fluidic pick-up device and a diffusor is provided around the pick-up nozzle, the lower neck of which terminates into an outlet chamber, formed in the bottom of the fluidic pick-up device.

DESCRIPTION OF PREFERRED EMBODIMENT

The arrangement shown in the drawing comprises a liquid collecting tank 5 connected by a connecting conduit 61 to the body of a regulating discharge valve 4, a discharge conduit 62 being connected to the discharge end of the valve. Device 1 is in the form of an influx chamber 100, chamber 100 being connected to the tank 5 by a flange connection 16. Disposed vertically within the chamber 100 there is a perforated screening mantle 13 which defines an interaction chamber 102 within it. A horizontally disposed trough 15 has its entrance end disposed within the tank 5, the exit ends of its side walls terminating within the influx chamber 100 somewhat short of the screening mantel 13. The bottom wall of trough 15 extends to the right end vertical wall of the influx chamber 100, as shown.

Mounted upon the upper wall of the chamber 100 and having its lower end projecting downwardly thereinto coaxial of the mantle 13, there is a first, transmitter nozzle 11 which is connected by a conduit 110 to a diagrammatically shown source 111 of a liquid medium under constant positive pressure difference toward collecting tank 5. The nozzle 11 directs a jet 104 of gas downwardly upon the body 7 of the liquid which has passed from the body 101 of liquid in the influx chamber 100 through the perforations 25 in the screening mantle 13 into the interaction chamber 102 within the mantle. The jet 104 interacts with the body of liquid 7 to form a downwardly directed jet 105 of a mixture of liquid, vapor and non-condensing gas.

Disposed coaxially of the nozzle 11 is a second, pick-up nozzle 12 having its upper, entrance end terminating at about the level of the lower end of the mantle 13. A sleeve-like diffusor 14 having a curved inner wall in the form of a part of a torus is disposed coaxial of the nozzle 12, the upper end of the diffusor 14 abutting the lower end of the mantle 13. It will be seen that the annular outer portion of the jet 105 of the two-phase mixture passes between the outer surface of the pick-up nozzle 12 and the inner surface of the diffusor 14 and into a lower portion 103 of the influx chamber 101, such portion of the mixture being returned to the body of liquid 6 within the tank 5 by passing beneath the lower wall of the trough 15.

The central portion of the jet 105 of the gas-liquid mixture is received within the central vertical bore within the pick-up nozzle 12 and then travels downwardly within a vertical conduit or central channel 21 the upper end of which is joined to the lower end of the nozzle 12. The lower end of the conduit 21 extends into a second, separator chamber 2, the lower end of conduit 21 being perforated at a plurality of locations 26. The chamber 2 thus contains a body of liquid 27 in the lower end portion thereof, liquid 27 having been derived from the two-phase mixture forwarded to the chamber 2. The upper end of chamber 2 contains vapor and gas which has been separated from such mixture. Also extending into the chamber 2 from the top thereof is the lower vertically disposed end portion 22 of a conduit 23, the upper end of conduit 23 being connected to the tank 5 beneath the trough 15, as shown. The portion 22 of the conduit 23 is provided with an opening 220 through the side wall thereof, opening 220 being disposed somewhat below the top wall of the chamber 2. The conduit 23 with its part 22 and the opening 220 through the side wall thereof form a two-phase outlet nozzle the manner of operation of which will be disclosed in detail below.

The lower end of the chamber 2 is connected by a conduit 24 of hydraulic signals to the upper end of a cylinder 3 of a hydraulic servo motor which controls the discharge valve 4. Reciprocating within the cylinder 3 is a piston 31 having a piston rod 36 connected thereto, the piston being constantly urged into its upper position by a coil compression spring 32, the upper end of which abuts the piston 31 and the lower end of which abuts the transverse lower end wall 37 of the cylinder 3. The lower end of the piston rod 36 beneath the end wall 37 of the cylinder has a movable valve element 33 connected thereto, element 33 reciprocating within a sleeve 34 which is fixedly secured to the casing of the valve 4. Sleeve 34 has aligned apertures 40 in the lower end of the side wall disposed in an alignment with the end of the conduit 61 adjacent the entrance end of the valve and the discharge conduit 62 connected to the discharge end of the valve. It will be seen that when the piston 31 and the valve element 33 are in the raised position shown discharge valve 4 is fully open. When the piston 31 is driven downwardly by fluid pressure delivered to its upper end through the conduit 24 apertures 40 of valve 4 are progressively closed until they reach a fully closed position when the pressure in conduit 24 reaches a predetermined level.

The lower end of the space within the cylinder 3, beneath the piston 31, is connected to the conduit 61 by a pressure-equalizing conduit 35. The space in the cylinder 1 beneath the piston 31 is separated from the space inside of valve body 4 by the sealing 38. This space has the same pressure level as the end of the connecting conduit 61 in front of the point to the valve body 4. Vertical holes 39 disposed radially in the valve element 33 equalize the pressure under and over the element 33.

MANNER OF OPERATION OF THE ARRANGEMENT

The operation of the arrangement according to this invention is not based on the mixing of a turbulent condensate jet, but on the mixing of turbulent jet of liquid, for instance condensate. The transmitting nozzle 11 is supplied with a liquid medium under constant positive difference pressure toward pressure inside of the collecting tank 5. Origin of the two-phase mixture of the jet takes place just on leaving the transmitting nozzle 11, where the jet in the narrow zone of decay velocity profile entrains the fluid from the environment.

A quick transmission of information about the height of the regulated liquid level in the collecting tank 5 to the externally situated fluidic pick-up device 1 is afforded by the passage of condensate via the trough 15 into the influx chamber 101. Due to a difference of levels of liquid 7 inside and liquid 101 outside the screening mantle 13 the condensate flows into the interaction chamber 102 and after the mixing of the condensate with the gaseous jet the generated jet 105 of the two-phase mixture is conveyed due to its momentum to the level of the opening in the upper end of the pick-up nozzle 12 and the upper end of the diffusor 14, where the core of the jet 105 of the two-phase mixture is cut off and is substantially stabilized by the cylindrical bore in the body of the pick-up nozzle 12. The rest of the mixture flows through the diffusor 14 into the discharge chamber 103 and via the channel below the bottom of the trough 15 in the connection 16. It flows freely back into the collecting tank 5.

The kinetic energy of the stream of the two-phase mixture passing through the pick-up nozzle 12 is transformed to pressure and the compressed mixture flows via the central channel or conduit 21 into the separator 2, in the internal space of which a separation of the gas and liquid phase takes place. Under a static condition there is also created a free level at the height of the through-flow section of the two-phase outlet nozzle 22. The pressure level in the separator 2 thereby corresponds to the flow of masses through the central channel 21 and through the two-phase nozzle 22 and is transmitted via the impulse conduit 24 above the piston 31 in the cylinder 3. The resulting force of the force generated by the pressure of the condensate 27 on the piston 31 and the compression of the spring 32 determines the position of the mutually firmly connected system piston 31, piston rod 36, and valve element 33 with respect to openings 40 of the connecting liner 34 of valve 4, and determines the throughflow section of the condensate through the body of the regulating valve 4 and the connecting conduit 61 from the collecting tank 5. The pressure level in the cylinder 3 below the piston 31 is equalized with the pressure in the connecting conduit 61 upstream of the body of the regulating valve 4 by the equalizing conduit 35.

The dynamic response of the regulating feedback loop regulating the condensate level of the regeneration heater of a steam turbine can be explained by a dynamic response to a sudden drop of supply of condensate into the collecting tank 5. A lowering of the supply of the condensate at an (at the given moment constant) outflow via the connecting conduit 61 and via the body of the regulating valve 4 causes a drop of the liquid level in the collecting tank 5 and a reduction in the rate of passage of the condensate over the trough 15 into the influx chamber 101 of the fluidic pick-up device 1. The level in the reflux chamber 101 drops very quickly, and the reduced difference of liquid levels inside and outside the screened mantle 13 causes a reduction of the rate of passage of liquid into the interaction chamber 102, a reduction of the height of the liquid layer above the pick-up nozzle 12, and thus an increase in the rate of passage of the mixture into the pick-up nozzle 12. The increased supply of the mixture into the separator 2 via the central channel 21 increases the pressure in the separator 2. The pressure increase is transmitted via the impulse conduit 24 above the piston 31 of the cylinder 3. The changed resultant forces starts to shift the piston 31, piston rod 36 and the valve element 33 in the valve 4, and thus reduces the rate of passage of condensate through the body of the regulating valve 4, the connecting conduit 61, and consequently also the removal of condensate from the collecting tank 5. The speed of shifting of the piston 31 is determined by the supply of condensate into the cylinder 3, by the passage through the impulse conduit 24, and by the outflow of the condensate caused by the drop of the liquid level in the separator 2. The passage of the gaseous (gas or steam) phase prevails in the throughflow cross section of the two-phase outlet nozzle 22 due to the drop of the liquid level and the thus reduced outflow of the mass causes a quick pressure increase in the separator 2. This process is amplified by positive feedback until the influence of the negative feedback between the stroke of the valve element 33, due to the passage through the connecting conduit 61 and due to the increase of height of the liquid level in the collecting tank 5 prevails; this effect is also due to a reduction of the passage of the mixture from the fluidic pick-up device 1 into the separator 2. The dynamic influence of the positive feedback can be easily influenced by changes of the geometry of the two-phase outlet nozzle 22, and thus the dynamic behavior of the whole regulating feedback loop can be optimized.

The generation of a water shock or hammer due to a quick closing of the regulating valve 4 is prevented, according to this invention, by the interconnection of the space below the piston 31 in the cylinder via the equalizing conduit 35 to the connecting conduit 61, whereby due to transfer of a pressure increase from the connecting conduit 61 to the space below the piston 31, the speed of reduction of the passage of condensate beyond the regulating system is limited.

The arrangement according to this invention is not subject to disturbing influences due to mechanical vibrations, due to an electrically radiating background, or due to an interference action of electromagnetic fields, and is thus particularly suitable for energy producing and chemical plants. The invention can be especially applied where a regulation of liquid levels with a small regulating movement and with a quick dynamic response to sudden changes of liquid supply is required, together with a high reliability of operation, all of which achieved since only a single mechanically movable part is used in the whole regulating circuit.

Although the invention is illustrated and described with reference to one preferred embodiment thereof, it is to be expressly understood that it is in no way limited to the desclosure of such a preferred embodiment, but is capable of numerous modifications within the scope of the appended claims.

We claim:

1. An arrangement for the regulation of the level of a liquid in a system having a collecting tank for the liquid, a first conduit connected to the tank for discharging liquid from the tank, and a controllable liquid discharge valve interposed in the first conduit, said arrangement comprising a first, influx chamber communicating with the interior of the tank, a first, downwardly directed transmitter nozzle disposed in the upper portion of the influx chamber, a source of gaseous medium under constant pressure connected to the first nozzle, a second, upwardly open pick-up nozzle disposed in alignment with the first nozzle and vertically spaced therefrom so that liquid in the influx chamber can flow into the space between the two nozzles to form a two-phase mixture which is received by the second nozzle, means restricting the rate of flow of liquid from the tank into the space in the influx chamber between the first and second nozzles, a second chamber, a two-phase, gas-liquid separatur in the second chamber, a second conduit connected between the outlet end of the second nozzle and the second chamber to conduct to the second chamber the two-phase mixture formed by interaction of gas from the first nozzle with the liquid in the influx chamber between the nozzles, means for separating the gas from the two-phase mixture in the second chamber, and means responsive to the pressure of the liquid which is separated from the gas in the second chamber to control the liquid discharge valve so as to maintain the level of the liquid in the tank substantially constant.

2. The arrangement claimed in claim 1, wherein means for separating the gas comprises a third conduit connecting the second chamber with the tank, said third conduit having a generally vertically disposed lower end portion constituting a third, two-phase nozzle disposed within the second chamber and having an opening therein located somewhat below the top of the second chamber in position to be successively covered and uncovered by the top of the body of liquid contained in the second chamber.

3. The arrangement claimed in claim 1, wherein the discharge valve includes fluid pressure operated means for controlling the valve, and comprising a fourth conduit connecting the lower part of the second chamber with the fluid pressure operated means which controls the discharge valve.

4. The arrangement claimed in claim 1, comprising a liquid conducting trough which leads from an entrance and thereof disposed in the interior of the tank to a discharge and thereof adjacent the first and second nozzles, and the means restricting the rate of flow of liquid from the tank into the space in the influx chamber between the first and second nozzles comprises a cylindrical mantle which is disposed within the influx chamber, the mantle having a perforated wall which is generally coaxial of the first and second nozzles.

5. The arrangement claimed in claim 1, comprising a sleeve-like diffusor which surrounds and is radially spaced from the upper end of the second nozzle, the diffusor being disposed above the bottom of the influx chamber.

* * * * *